United States Patent
Miller

(10) Patent No.: US 12,246,706 B2
(45) Date of Patent: Mar. 11, 2025

(54) TARGET IDENTIFICATION SYSTEM AND METHOD FOR VEHICLES

(71) Applicant: Bendix Commercial Vehicle Systems LLC, Avon, OH (US)

(72) Inventor: Justin R. Miller, Elyria, OH (US)

(73) Assignee: Bendix Commerical Vehicle Systems LLC, Avon, OH (US)

(*) Notice: Subject to any disclaimer, the term of this patent is extended or adjusted under 35 U.S.C. 154(b) by 174 days.

(21) Appl. No.: 18/164,861

(22) Filed: Feb. 6, 2023

(65) Prior Publication Data
US 2024/0262347 A1  Aug. 8, 2024

(51) Int. Cl.
*B60W 10/18* (2012.01)
*B60W 10/20* (2006.01)
(Continued)

(52) U.S. Cl.
CPC ............ *B60W 30/09* (2013.01); *B60W 10/18* (2013.01); *B60W 10/20* (2013.01); *B60W 30/08* (2013.01);
(Continued)

(58) Field of Classification Search
CPC .. B60W 10/18; B60W 10/182; B60W 10/184; B60W 10/188; B60W 10/192;
(Continued)

(56) References Cited

U.S. PATENT DOCUMENTS

| 10,089,537 B2 | 10/2018 | Nix et al. |
| 2002/0138193 A1* | 9/2002 | Miyahara ........... B60K 31/0008 701/72 |

(Continued)

FOREIGN PATENT DOCUMENTS

| CN | 111634290 A | 9/2020 |
| CN | 114537388 A | 5/2022 |

(Continued)

OTHER PUBLICATIONS

European Patent Office, "International Search Report and Written Opinion," Report, Apr. 17, 2024, 10 pages, European Patent Office Rijswijk Netherlands.

(Continued)

*Primary Examiner* — Erick R Solis
(74) *Attorney, Agent, or Firm* — Cheryl L. Greenly; Geoffrey A. Kudlo; Brian E. Kondas

(57) ABSTRACT

A vehicle system for a host vehicle includes a braking controller for implementing service braking on a host vehicle in response to a brake request message and a lane keep assist controller for transmitting a message indicative of the host vehicle departing from an identified lane of travel of a roadway and transmitting a message for maintaining the host vehicle in the identified lane of travel. The system also includes an automatic emergency braking controller for detecting a first vehicle in front of the host vehicle and tracking the first vehicle as a primary target. The automatic emergency braking controller discontinues tracking the first vehicle as the primary target in order to suppress alerts in response to the lane keep assist controller being active and the first vehicle traveling in a different lane of the roadway than the identified lane of travel of the host vehicle.

8 Claims, 3 Drawing Sheets

(51) Int. Cl.
| | |
|---|---|
| *B60W 30/08* | (2012.01) |
| *B60W 30/09* | (2012.01) |
| *B60W 30/095* | (2012.01) |
| *B60W 30/12* | (2020.01) |
| *B60W 40/072* | (2012.01) |

(52) U.S. Cl.
CPC ...... *B60W 30/095* (2013.01); *B60W 30/0956* (2013.01); *B60W 30/12* (2013.01); *B60W 40/072* (2013.01); *B60W 2554/80* (2020.02)

(58) Field of Classification Search
CPC .... B60W 10/20; B60W 30/08; B60W 30/085; B60W 30/09; B60W 30/095; B60W 30/0956; B60W 30/12; B60W 30/16; B60W 30/162; B60W 30/165; B60W 40/072
USPC ............................................... 701/41, 43, 70
See application file for complete search history.

(56) References Cited

U.S. PATENT DOCUMENTS

| | | | | |
|---|---|---|---|---|
| 2012/0330528 | A1* | 12/2012 | Schwindt | G01S 13/58 701/96 |
| 2021/0025989 | A1* | 1/2021 | Vallespi-Gonzalez | G01S 7/4802 |
| 2021/0188282 | A1* | 6/2021 | Zhu | B60W 30/14 |
| 2022/0281456 | A1 | 9/2022 | Giovanardi | |
| 2023/0140569 | A1* | 5/2023 | Foster | B60W 30/18159 701/400 |
| 2023/0289983 | A1* | 9/2023 | Chumerin | G06T 7/248 |
| 2024/0042972 | A1* | 2/2024 | Kim | B60T 17/22 |

FOREIGN PATENT DOCUMENTS

| | | |
|---|---|---|
| DE | 102014004418 A1 | 10/2015 |
| JP | 2009166537 A * | 7/2009 |
| KR | 102007359 B1 | 8/2019 |

OTHER PUBLICATIONS

Ping-Min Hsu, et al. "Car Trajectory Prediction in Image Processing and Control Manners," Paper, 2016, 5 pages, 978-1-4673-9048-16, IEEE International Conference on Intelligent Transportation Engineering, United States.

Wasif Javaid, et al. "Design and Implementation of Vehicle Automatic Emergency Pull Over Strategy Using Active Safety Systems on a Driving Simulator," Technical Paper, Oct. 11, 2017, 8 pages, 20184112, International Journal of Automotive Engineering, vol. 9, No. 4 (2018), United States.

Markus Schratter, et al. Pedestrian Collision Avoidance System for Scenarios with Occlusions,: Paper, 2019, 7 pages, 978-1-7281-0560-4-19, IEEE Intelligent Vehicles Symposium, United States.

* cited by examiner

TARGET IDENTIFICATION SYSTEM AND METHOD FOR VEHICLES

BACKGROUND

The present application relates to a system, controller and method to provide improved target identification when a commercial vehicle equipped with automatic emergency braking (AEB) detects forward targets while in a curve.

In commercial vehicle applications, different systems control service braking, lane keep assist and automatic emergency braking. Different sensors throughout the vehicle provide the information for these systems to determine which targets to use in automatic emergency braking and how to maintain the vehicle in its lane of travel using active lane keep assist in combination with driver alerts. Each system provides alerts to the driver based on the various sensor input to provide automated driver assistance. A system that provides alerts that the driver interprets as too frequent or unnecessary will begin to be ignored. Therefore, there is interest in improving the functionality of automatic emergency braking and lane keep assist based on the sensor input and presence of different control systems on the vehicle.

SUMMARY

In accordance with one embodiment, a vehicle system for a host vehicle includes a braking controller for implementing service braking on a host vehicle in response to a brake request message and a lane keep assist controller for transmitting a message indicative of the host vehicle departing from an identified lane of travel of a roadway and transmitting a message for maintaining the host vehicle in the identified lane of travel. The system also includes an automatic emergency braking controller for detecting a first vehicle in front of the host vehicle and tracking the first vehicle as a primary target. The automatic emergency braking controller discontinues tracking the first vehicle as the primary target in order to suppress alerts in response to the lane keep assist controller being active and the first vehicle traveling in a different lane of the roadway than the identified lane of travel of the host vehicle.

In accordance with another embodiment, a method for controlling a vehicle includes identifying a first vehicle ahead of a host vehicle as a primary target using an automated emergency braking controller and identifying a lane keep assist system as being active. The method includes detecting that the first vehicle is traveling in a different lane of travel than the host vehicle; and discontinuing tracking of the first vehicle as the primary target in response to the detection to suppress the alerts in response to the first vehicle being in a different lane of travel and the lane keep assist system being active.

DETAILED DESCRIPTION

Figure 1:
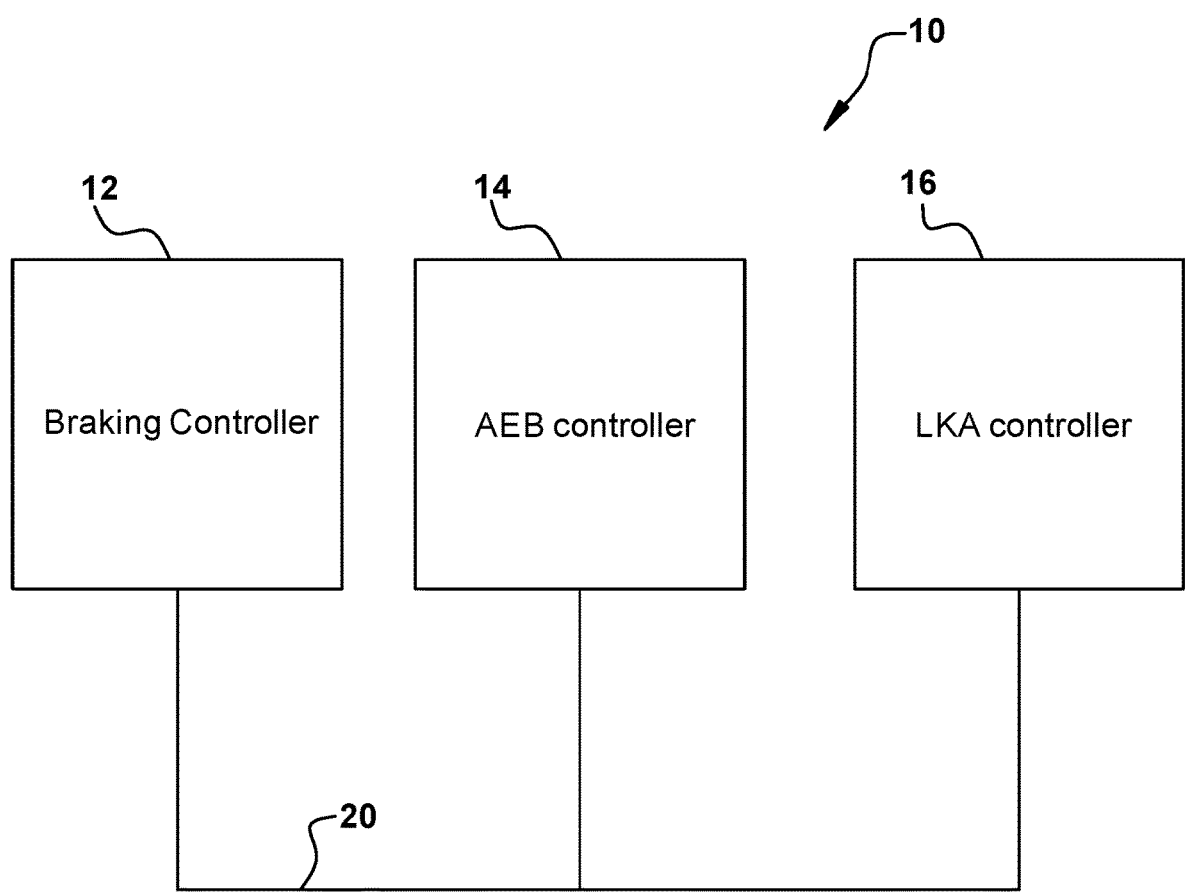
FIG. 1 is a representation of a system on a commercial vehicle according to one example of the present invention.

Referring to FIG. 1, a system 10 for a commercial host vehicle according to one example of this invention is shown.

The vehicle system 10 includes a braking controller 12, which controls the service braking of vehicle under certain conditions. Braking controller 12 may include functionality to control anti-lock braking and stability control. Braking controller 12 responds to signals from sensors connected directly to the braking controller 12 or responds to messages received from other controllers on the vehicle. The braking controller 12 transmits signals to activate electropneumatic devices at each wheel end to assist in slowing and stopping the vehicle before the driver intervenes or in addition to driver intervention.

The vehicle system 10 includes an automatic emergency braking (AEB) controller 14, which transmits messages regarding potential obstacles in front of the vehicle. The AEB controller 14 may receive information about the obstacles from sensors affixed to the vehicle, such as cameras, radars, LIDAR, etc. Specifically, the AEB controller 14 is looking for other vehicles traveling on the same roadway that may be slowing down or moving into the host vehicle's lane of travel. In general, the AEB controller 14 identifies a target vehicle based on the trajectory of the host vehicle and prioritizes relevant vehicle targets in the path of the host vehicle. An alert is triggered when the host vehicle is within a pre-programmed distance from an identified target vehicle. Braking intervention is requested by the AEB controller 14 when a second, shorter distance between the host vehicle and the target vehicle is breached.

The vehicle system 10 includes a lane keep assist (LKA) controller 16, which recognizes lane markings and the position of the host vehicle within those lane markings. The LKA controller 16 transmits messages regarding whether the vehicle is staying between the lane markings while the host vehicle is traveling on a roadway. The LKA controller 16 may receive signals about the lane markings from sensors affixed to the vehicle, such as cameras. The LKA controller 16 is typically active upon start up of the host vehicle, but may be deactivated by the driver or automatically be set to deactivated due to an error in the LKA controller 16 or its sensors. In addition, infrastructure issues, such as an absence of lane markings or poor quality markings, may also cause the LKA controller 16 to temporarily deactivate LKA features.

The braking controller 12, the AEB controller 14 and the LKA controller 16 communicate on a vehicle serial communication bus 20. Messages may be transmitted and received using a known protocol, such as SAE J1939, on the communication bus 20. Alerts, including but not limited to following distance and lane departure, may be transmitted to a driver interface via the communications bus 20 or directly to the vehicle dash as of a visual or audible notification.

The AEB controller 14 transmits messages on the communication bus 20 when the controller 14 determines that service braking may be necessary to mitigate a collision with a target vehicle. The level of braking requested depends on the velocity of the vehicle and the location of the target vehicle. The level of braking may also depend on the available braking power within the service braking system of the vehicle. For example, in a pneumatic braking system, the level of braking available is limited by the amount of pressure stored in the service braking reservoirs. The braking controller 12 responds to the messages by activating the service brakes automatically to slow or stop the vehicle.

The LKA controller 16 transmits messages on the communication bus 20 when the LKA controller 16 determines that the vehicle is drifting out of a lane of travel and the driver did not indicate an intentional lane change. The LKA controller 16 will request a steering and/or a braking intervention if it determines that the host vehicle is not staying within the current lane of travel. The AEB controller 14 may respond by transmitting a message on the communication bus 20 to the braking controller 12 to request service braking at the maximum limit of brake pressure available in order to prevent highway departure based on messages received from the LKA controller 16.

In another example, the functions of each type of controller 12, 14, 16 may 16 may be combined in a single controller.

Therefore, a vehicle system for a host vehicle includes a braking controller for implementing service braking on a host vehicle in response to a brake request message and a lane keep assist controller for transmitting a message indicative of the host vehicle departing from an identified lane of travel of a roadway and transmitting a message for maintaining the host vehicle in the identified lane of travel. The system also includes an automatic emergency braking controller for detecting a first vehicle in front of the host vehicle and tracking the first vehicle as a primary target. The automatic emergency braking controller discontinues tracking the first vehicle as the primary target in order to suppress alerts in response to the lane keep assist controller being active and the first vehicle traveling in a different lane of the roadway than the identified lane of travel of the host vehicle.

Figure 2:
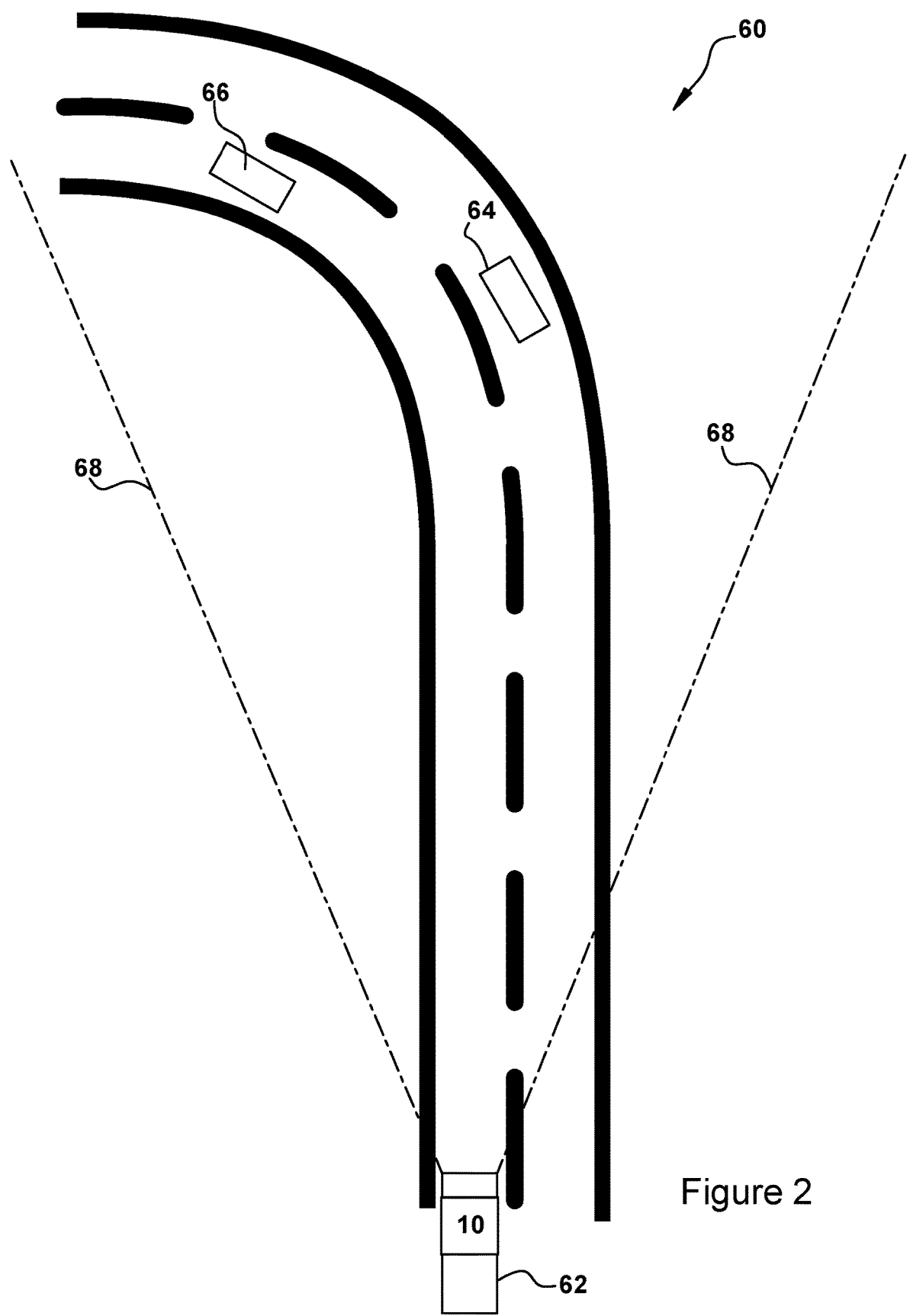
FIG. 2 is a representation of a vehicle equipped with the system as in FIG. 1 as traveling on a roadway.

FIG. 2 depicts a roadway 60 having two lanes of traffic moving in the same direction. Host vehicle 62 having vehicle system 10 is traveling on the roadway 60. The roadway 60 has a straight portion and a curved portion. Ahead of the host vehicle 62 is a first vehicle 64 and a second vehicle 66. Roadway 60 is shown with the host vehicle 62 traveling on a straight portion and the first vehicle 64 and the second vehicle 66 traveling on a curved portion. In another example, the host vehicle 62 may be traveling on a curved portion of the roadway 60 and the first vehicle 64 and the second vehicle 66 are traveling on a straight portion of the roadway 60.

The AEB controller 14 initially identifies the first vehicle 64 in its field of view 68 as a primary target since it is nearer in distance to the host vehicle 62. The distance, the offset or both between the host vehicle 62 and other vehicles on the roadway 60 are factored into the initial determination the AEB controller 14 makes with respect to assigning a primary target. However, the first vehicle 64 is in the rightmost lane of the two lanes moving in the same direction. In a vehicle without the present vehicle system 10, the AEB controller 14 would activate an alert based on the distance to the first vehicle 64 because it is the nearest vehicle in distance to the host vehicle 62 due to the curvature of the roadway 60. With the present vehicle system 10, when the host vehicle 62 is in the leftmost lane, the assumption is that the host vehicle 62 will remain in the same lane as long as the LKA controller 16 is active, unless the driver intentionally changes lanes. Therefore, the likelihood of a collision with the first vehicle 64 traveling in a different lane is low.

In the host vehicle 62 equipped with the vehicle system 10, the AEB controller 14 will recognize that the LKA controller 16 is active. Therefore, the host vehicle 62 will automatically be controlled to remain in the leftmost lane unless acted upon by the driver. With the present vehicle system 10, the AEB controller 14 will purposefully filter out the first vehicle 64 and select the second vehicle 66 as the primary target. The AEB controller 14 will act upon the distal relationship with the second vehicle 66 with respect to alerts and/or brake interventions since the second vehicle 66 is in the same lane as the host vehicle 62. The AEB controller 14 takes this action even though the second vehicle 66 is a farther distance away than the first vehicle 64.

In other words, the AEB controller 14 will designate the first vehicle 64 as a secondary target, which means it is not a presently actionable threat to the safety of the host vehicle 62. The AEB controller 14 will select the second vehicle 66 as the primary target to act upon. Alerts related to the relationship between the host vehicle 62 and the first vehicle 64 will be suppressed.

If there is no second vehicle 66 to select as the primary target, the AEB controller 14 will act as if no immediate threat exists, and thereby suppress AEB related alerts and/or interventions.

The vehicle system 10 will operate in the same manner if the first vehicle 64 and the second vehicle 66 are traveling on a straight portion of the roadway and the host vehicle 62 is traveling on a curved portion of the roadway. With the configuration and operation of vehicle system 10, there is less likelihood of unwanted alerts or brake interventions.

Figure 3:
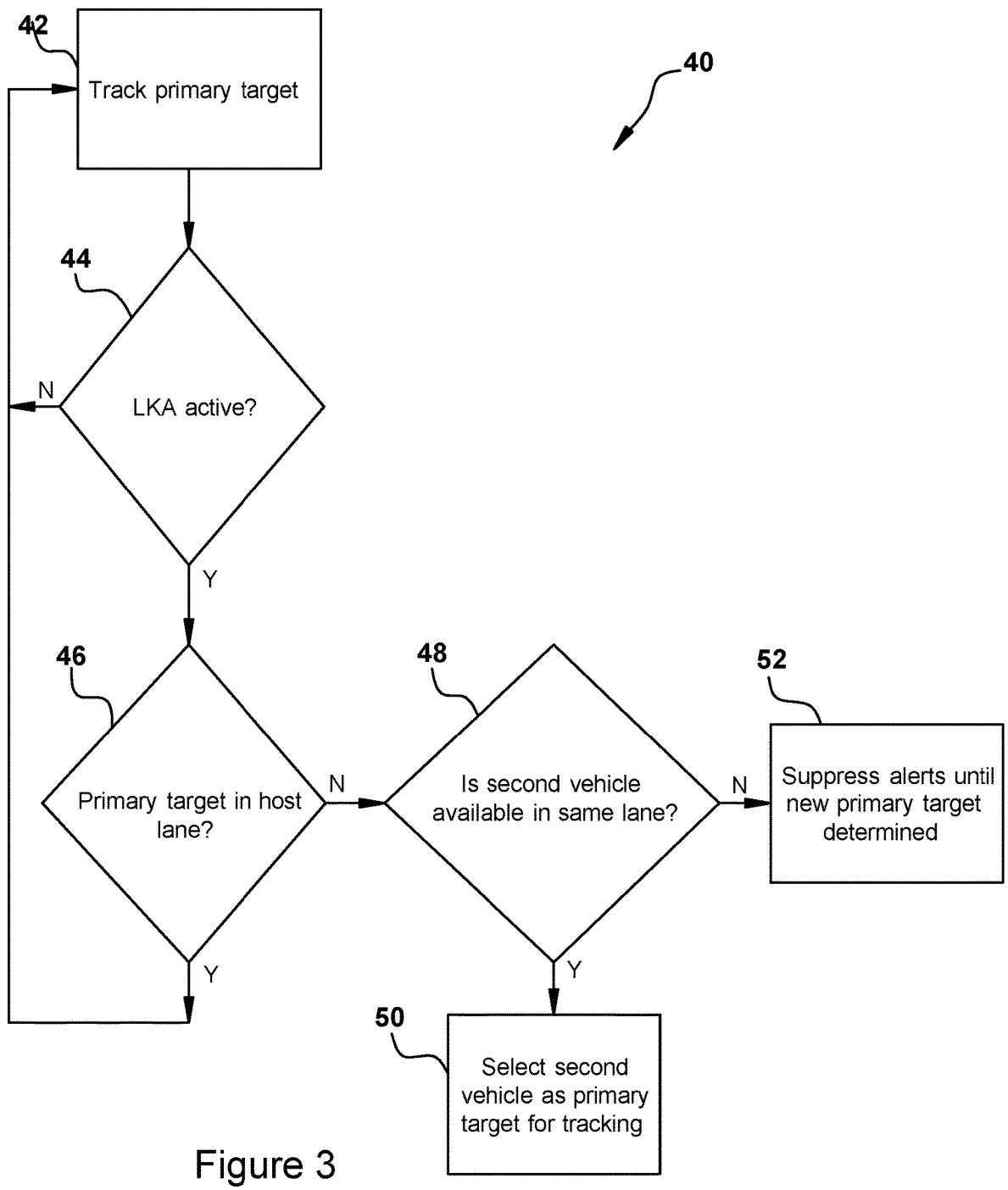
FIG. 3 is a flowchart of the operation of the system as in FIG. 1.

FIG. 3 shows a method 40 of implementing the improved target detection using the vehicle system 10. In step 42, the AEB controller 14 is tracking a primary target, such as first vehicle 64.

In step 44, the AEB controller 14 determines that the LKA controller 16 is active. The AEB controller 14 may be receiving LKA activity messages over the communications bus 20 or may specifically send a message to the LKA controller 16 to request whether the LKA controller 16 is active. If the LKA controller 16 is not actively monitoring the lane markings on the roadway 60 for the host vehicle 62, due to the LKA controller 16 being disabled by the driver or for other reasons, then the method 40 returns to step 42.

If the LKA controller 16 is determined to be active in step 44, the method 40 proceeds to step 46. In step 46, the AEB controller 14 uses information from the LKA controller 16 to determine in which lane the primary target, first vehicle 64, is traveling relative to the host vehicle 62. The AEB controller 14 can determine using lane markings within its field of view 68 that the first vehicle 64 is traveling in a different lane than the host vehicle 62. From the LKA controller 16, the AEB controller 14 will determine if the first vehicle 64 is in an adjacent lane despite being in the current trajectory of the host vehicle. If the first vehicle 64 is in the same lane and/or same trajectory as the host vehicle 62, the method 40 will return to step 42 where the AEB controller 14 continues to track the first vehicle 64 as its primary target.

As in the example shown in FIG. 2, if there is curve in which the first vehicle 64 is traveling, then the first vehicle 64 may not be traveling in the same lane of the roadway 60 as the host vehicle 62. If the AEB controller 14 determines that the primary target is not traveling in the same lane, then the method 40 continues to step 48.

In step 48, the AEB controller 14 in step 48 determines if another vehicle, such as second vehicle 66, is available to track as a primary target as the second vehicle 66 is traveling in the same predicted path of travel as the host vehicle 62. If yes, the method 40 continues to step 50 such that the AEB controller 14 selects the second vehicle 66 to track as the primary target. The second vehicle 66 would not have been identified for tracking as a primary target in the prior systems since the second vehicle 66 is actually a further distance from the host vehicle 62. In another example, the second vehicle 66 may have a larger lateral offset from the host vehicle 62 than the first vehicle 64. Any alerts that would have been triggered by the first vehicle 64 will be suppressed.

If there is no second vehicle to set as a target, the method 40 continues to step 52. The AEB controller 14 will suppress any alerts or braking interventions that would have been triggered if the first vehicle 64 remained as a target. No AEB related alerts will be triggered until a new primary target is determined.

In this manner, the vehicle system 10 will improve driver experience by not triggering alerts or interventions on an initial target vehicle when the vehicle system 10 learns the target vehicle is not in the same lane, as the assumption is that the host vehicle with an active lane keep assist system will remain in its same lane.

Therefore, a method for controlling a vehicle includes identifying a first vehicle ahead of a host vehicle as a primary target using an automated emergency braking controller and identifying a lane keep assist system as being active. The method includes detecting that the first vehicle is traveling in a different lane of travel than the host vehicle; and discontinuing tracking of the first vehicle as the primary target in response to the detection to suppress the alerts in response to the first vehicle being in a different lane of travel and the lane keep assist system being active.

While the present invention has been illustrated by the description of example processes and system components, and while the various processes and components have been described in detail, applicant does not intend to restrict or in any way limit the scope of the appended claims to such detail. Additional modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. A vehicle system for a host vehicle comprising:
   a braking controller for implementing service braking on a host vehicle in response to a brake request message;
   a lane keep assist controller for transmitting a message indicative of the host vehicle departing from an identified lane of travel of a roadway and transmitting a message for maintaining the host vehicle in the identified lane of travel; and
   an automatic emergency braking controller for maintaining detection of at least one of a first vehicle and a second vehicle in front of the host vehicle and tracking the first vehicle as a primary target, wherein the automatic emergency braking controller suppresses alerts related to the first vehicle in response to the lane keep assist controller being active and the first vehicle traveling in a different lane of the roadway than the identified lane of travel of the host vehicle.

2. The vehicle system as in claim 1, wherein the first vehicle is traveling in a different lane of the roadway, wherein the roadway ahead of the host vehicle is curved.

3. The vehicle system as in claim 1, wherein the first vehicle is traveling in a different lane of the roadway, wherein the roadway in which the host vehicle is traveling is curved and the roadway ahead of the host vehicle is straight.

4. The vehicle system as in claim 1, wherein any of the braking controller, lane keep assist controller and automatic braking controller are combined in a single controller.

5. The vehicle system as in claim 1, wherein the alerts include alerts based on the following distance between the host vehicle and the primary target vehicle.

6. The vehicle system as in claim 1, wherein the automatic emergency braking controller selects a second vehicle for tracking as the primary target, wherein the second vehicle is in the same lane of the roadway as the host vehicle and is a farther distance away from the host vehicle.

7. A method for controlling a vehicle comprising:
   identifying at least one of a first vehicle and a second vehicle in front of a host vehicle as a primary target using an automated emergency braking controller;
   identifying a lane keep assist system as being active;
   maintaining detection that the first vehicle is traveling in a different lane of travel than the host vehicle; and
   surpressing alerts related to the first vehicle being in a different lane of travel and the lane keep assist system being active.

8. The method as in claim 7, further comprising identifying a second vehicle in the same lane of travel as the host vehicle as the primary target, wherein the second vehicle is in the same lane of travel as the host vehicle and a further distance from the host vehicle than the first vehicle.

* * * * *